A. RHENSTROM.
WIRE BENDING AND KNOTTING MACHINE.
APPLICATION FILED OCT. 24, 1919.
1,429,253.
Patented Sept. 19, 1922.
5 SHEETS—SHEET 3.
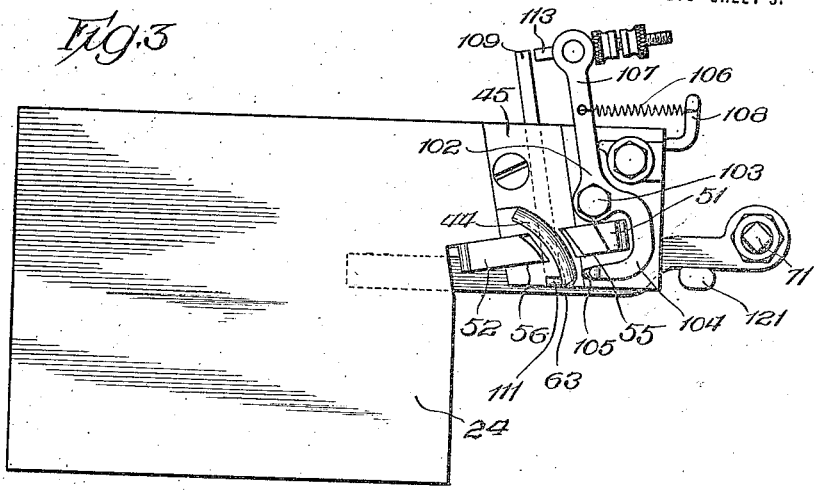
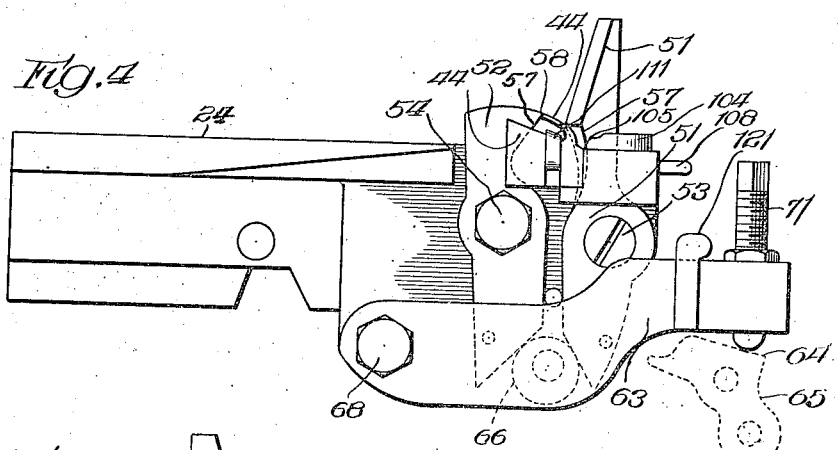
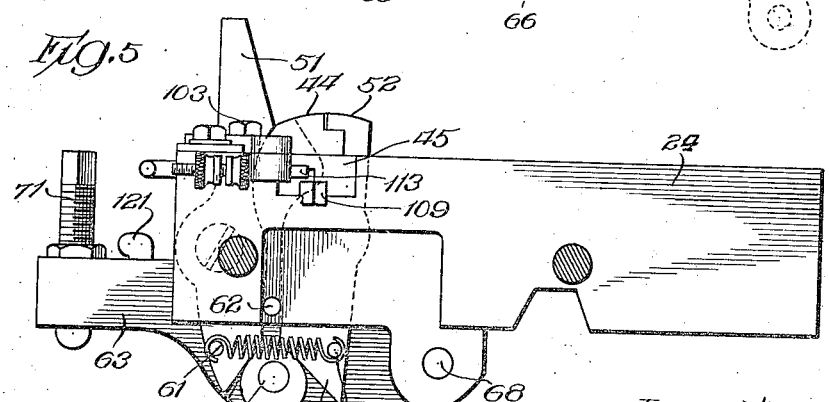

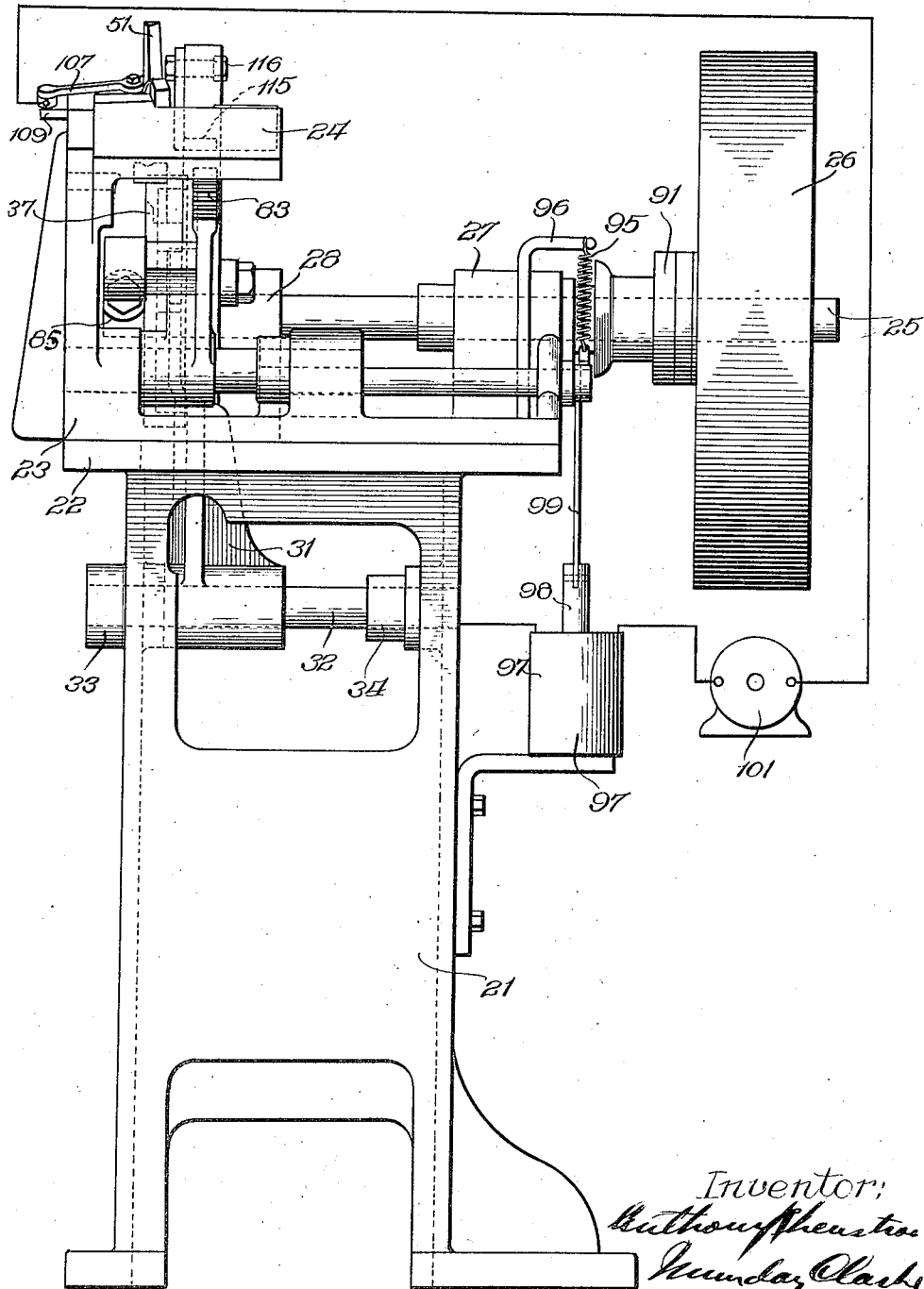

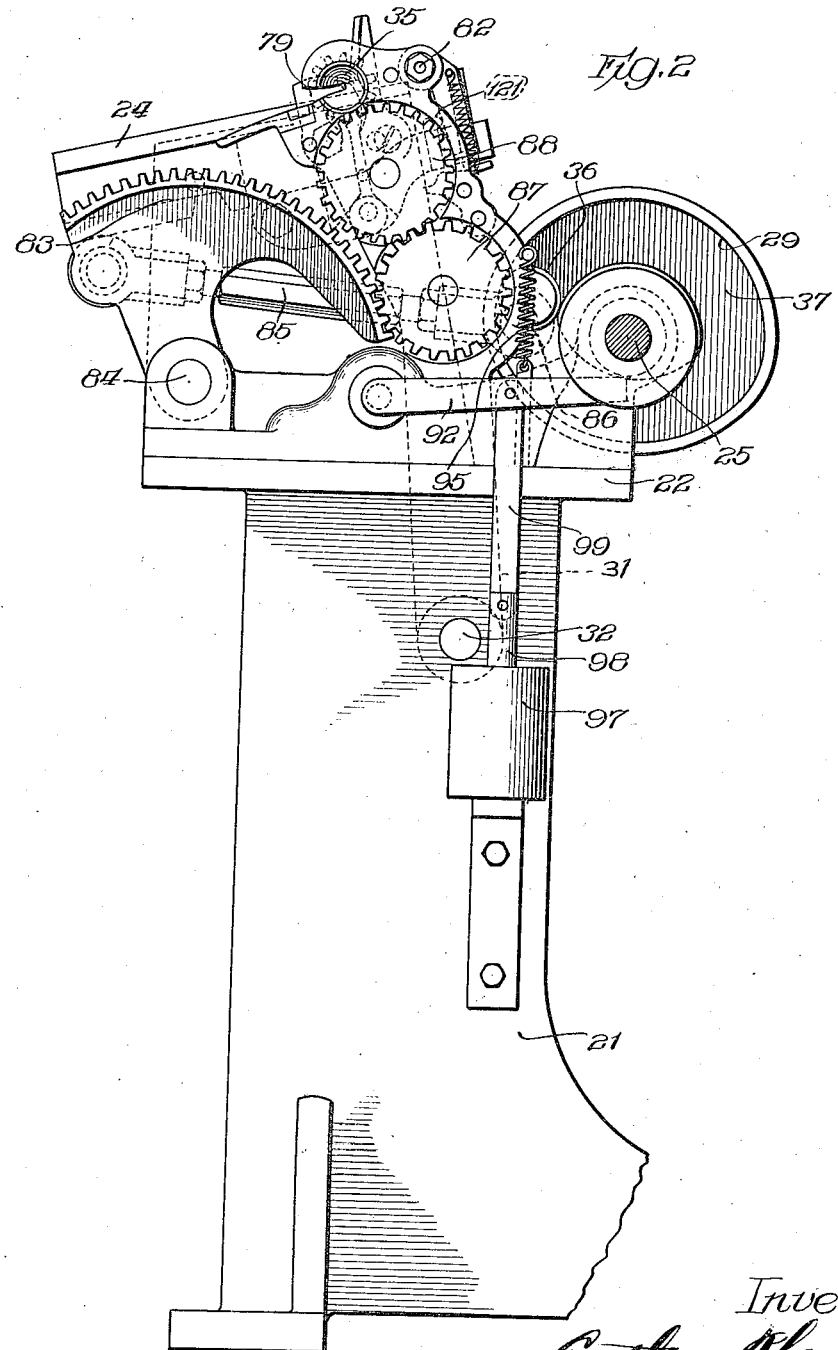

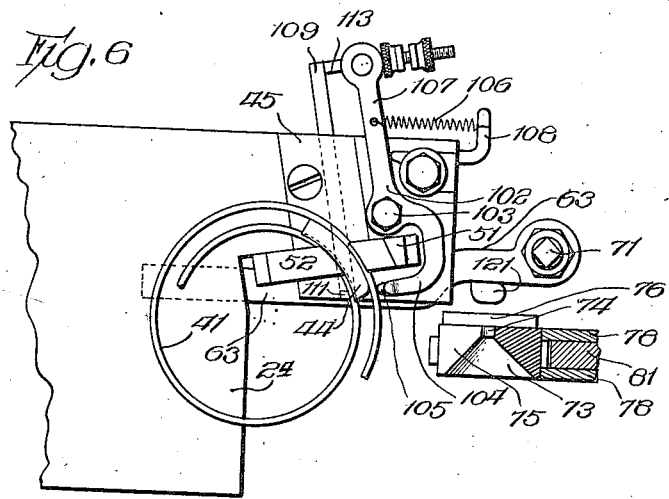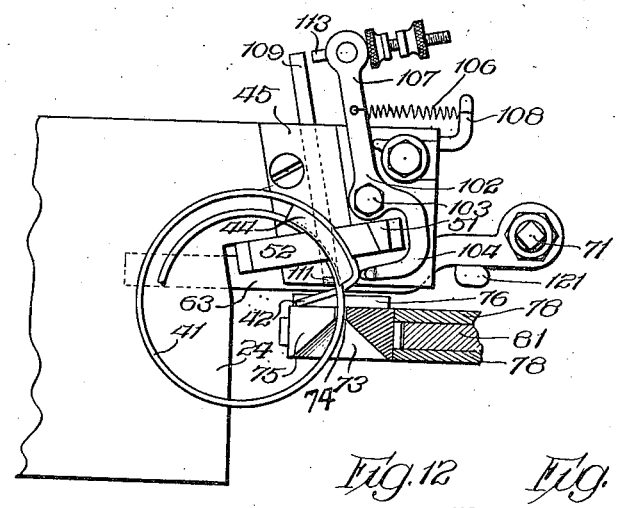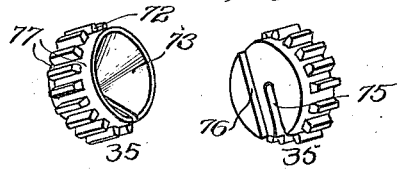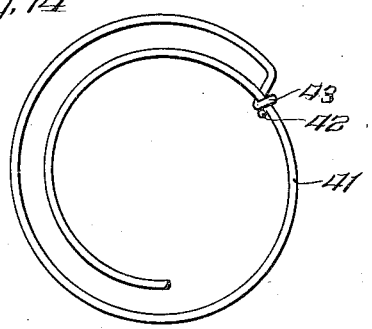

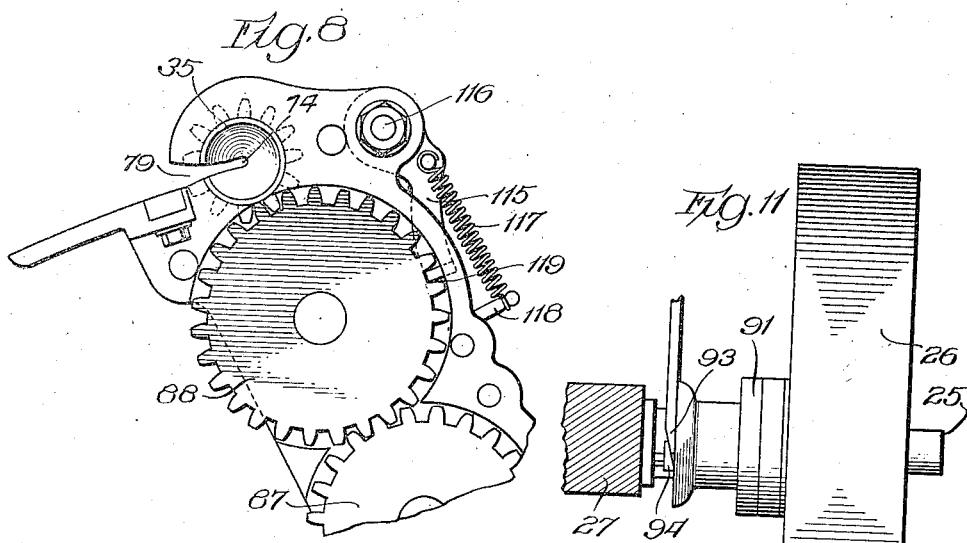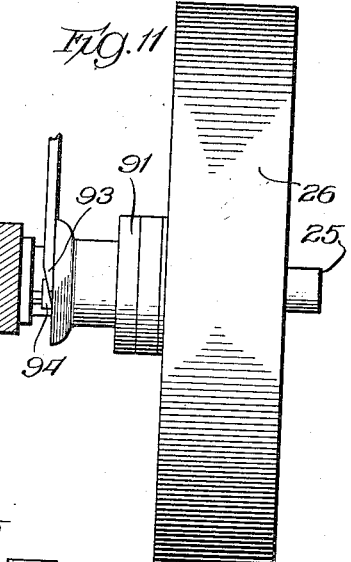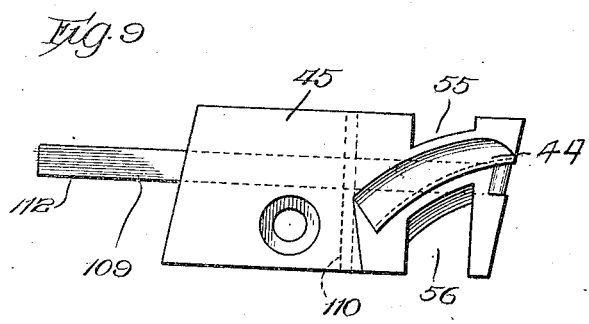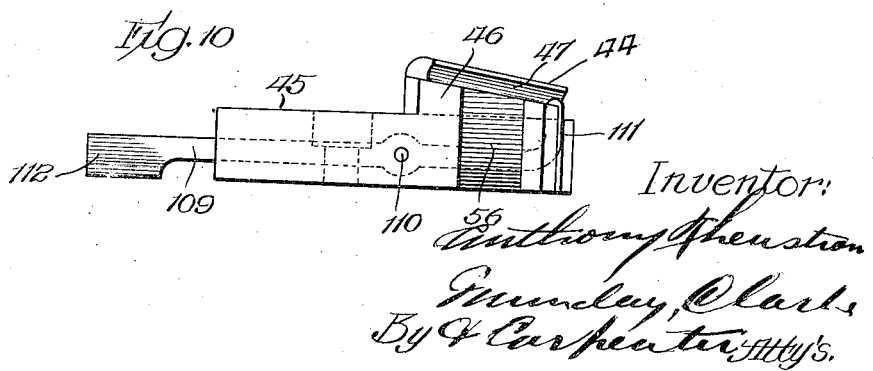

Patented Sept. 19, 1922.

1,429,253

UNITED STATES PATENT OFFICE.

ANTHONY RHENSTROM, OF KENOSHA, WISCONSIN.

WIRE BENDING AND KNOTTING MACHINE.

Application filed October 24, 1919. Serial No. 332,960.

To all whom it may concern:

Be it known that I, ANTHONY RHENSTROM, a citizen of the United States, residing in Kenosha, in the county of Kenosha and State of Wisconsin, have invented a new and useful Improvement in Wire Bending and Knotting Machines, of which the following is a specification.

This invention relates in general to wire bending machines and has more particular reference to machines of this kind adapted to knot the wire, for example in the manner usually employed in knotting the end of a bed spring coil to the course next above it, it is, however, believed that from certain aspects the invention is capable of application to other purposes and in machines other than merely knotters.

A principal object of the invention is the provision of a machine of the character described in which the action of the bending devices wil be rapid and positive in character, and in which the bending devices will be accurately stopped and started in their bending movement without danger of overthrow.

Another important object of the invention is the provision of a new and improved timing and driving mechanism for a knotting machine.

A still further object of the invention is the provision of a machine of the character described wherein the bending die will have a movement into and out of position the character of which insures accurate engagement with the wire.

A further object of the invention is the provision of a machine of the character described which may be wholly automatic in its action, the operative parts of the machine readily lending themselves to automatic control and the control itself being such that actuation of the operating parts automatically will occur when and only when the wire to be bent is accurately positioned.

A still further object of the invention is the provision of a wire knotting machine in which the two courses of wire to be knotted will be firmly clamped in accurate position, and as a further desirable feature, clamped with equal tightness.

Numerous other objects and advantages of the invention will be apparent as it is better understood from the following description, which taken in connection with the accompanying drawings discloses a preferred embodiment thereof.

On the drawing:

Figure 1 is a front view of a machine embodying my present invention.

Figure 2 is a side elevation looking from the right in Figure 1, the power pulley being removed from the shaft shown in section.

Figure 3 is a top plan view of the platen or support and the parts carried by it.

Figure 4 is a side view thereof looking up from the bottom of Figure 3.

Figure 5 is a side view looking from the other side of Figure 3.

Figure 6 is an enlarged partial view similar to Figure 3, and showing a bed spring coil in position for bending.

Figure 7 is a similar view to Figure 6 showing the initial bending operation.

Figure 8 is an enlarged detailed perspective of the bending die and its carrying means.

Figure 9 is an enlarged detailed view of the platen against which the courses of wire are held and bent.

Figure 10 is a side elevation thereof.

Figure 11 is an enlarged detailed view of the clutch.

Figures 12 and 13 are perspectives taken from opposite sides of the bending die, and Figure 14 illustrates a tied knot.

For the purpose of illustrating my present invention I have shown on the drawings a frame 21 of any desired construction, adapted to support in suitable fashion the several operating parts. In the present instance this frame supports a bed 22 from one side of which, i. e., the left viewing Figure 1 an arm 23 extends up and carries at the top a wire support 24 constituting an inclined table at convenient height to be readily reached by the operator.

A power shaft 25 carrying a power pulley 26 is mounted in bearings 27 and 28 extending up from the bed. This power shaft has a cam 29 fixed on its end remote from the pulley and beyond the bearing 28. A swinging arm 31 is pivoted upon a shaft 32 having bearings in the frame at 33 and 34 and this arm carries in its upper end a knotting and bending die 35. The die 35 is adapted to be moved into bending position with respect to the wire upon the support 25 by the action of the cam 29, and to this end the arm carries a roller 36 taking into the cam groove 37 of the cam.

The wire in the machine shown on the drawing consists of a coil spring 41, an end 42 of which is to be twisted around the next adjacent course, as indicated at 43 in Figure 14. Referring to Figures 6 and 7 the wire is placed by the operator so that a platen 44 is disposed between these courses and the end is then bent first as shown in Figure 7 and then up and over and around the course next above it. A hardened platen member 45 is secured in a recess of the table and this platen member is provided with an upwardly extending wire receiving part 46, formed and curved as shown in Figures 9 and 10. The end 42 is adapted to lie behind this raised portion 46 and the next course thereabove in an elevated recess or groove 47. When so positioned the bending die is moved into position for bending by the action of the cam 37. That is to say the machine is started and the operation goes on automatically until the knot is completed, at which time the machine stops, all as will be later explained. Prior to the bending operation however clamping devices come into action for holding the wires in accurate position.

These clamping devices comprise two levers 51 and 52 pivoted at 53 and 54 in recesses 55 and 56 in the platen. At the upper end each lever is provided with an undercut curved part 57 and 58 to engage over the wires and press them against the raised part 46 of the platen. The levers are normally pulled away from clamping position by a spring secured at 61 on the lower ends of the levers, a spacing pin 62 being provided to prevent the lever coming too closely together and to hold them in upright position. These clamping levers are thrown into action by movement of the end of a lever 63 over a cam surface 64 on a member 65 carried by the swinging arm 31, the lever 63 acting upon the clamping levers through the agency of a roller 66 engaging between bevelled ends 67 of the clamping levers. This lever 63 is pivoted at 68 in appropriate position on the table and the roller 66 is eccentrically mounted thereon at 69 so that the pressure exercised by the clamping levers will be equalized and this even where there is any inequality in the wire. An adjustable screw 71 is provided through the tail of the lever 63 for engagement with the surface 64 to accurately control the extent of clamping action.

The bending die itself consists of a member of general cylindrical form having gear teeth 72 on its outer face and having at one side a conical or flaring recess 73 terminating in a relatively small passage 74 through it. At one side a slot 75 is provided into the recess 74 to permit the upper course of the spring to pass through and back of the recess is provided a bending shoulder 76 to engage the end 42 of the wire and wrap it around the upper course when the die is rotated. At each side of the teeth 72 a bearing surface 77 is provided and the die is mounted in the upper end of the arm and between two plates 78 forming the sides of the arms and which embrace in part said bearing surfaces. These plates being also recessed, as indicated at 79 in Figure 2. The upper end of the arm proper is disposed between the plates 78 as indicated at 81, the plates being held in place by a bolt 82. When the clamps have moved down to hold the wire and the bending die is moved in the bending position by the swinging of the arm, the end 42 of the wire is bent over by engagement of the bending die and in position shown in Figure 7. Immediately thereafter this die is rotated in a clockwise direction viewing Figure 2 to wind the end about the adjacent course of wire and form the knot.

Automatically operable actuating devices receiving power from the shaft are brought into play by the movement of the arm to bring the bending die to bending position. A rack or gear segment 83 is pivoted at 84 on the bed 22 and this rack is connected by a connecting rod 85 to a crank pin 86 on the outer or left hand face of the cam 29, so that while the cam is rotating the rack segment will be oscillated. Upon the swinging arm are two gears 87 and 88 in mesh with each other and also with the teeth 72 of the bending die. The gear 87 is entrained with the rack 83 when the arm reaches its innermost position (leftmost position viewing Fig. 2) under the influence of the cam 29, and this occurs at the instant when the rack segment is momentarily at rest as an incident to its change of direction of oscillation. The driving parts are maintained entrained until desired rotation of the bending die has been accomplished, whereupon the arm is withdrawn by the cam, the gear 87 detrained from the rack and the parts brought back into position to permit insertion of the next spring for knotting.

The machine shown on the drawing is provided with an automatic control which starts the action when and as soon as the wire is in proper position. The pulley 26 is loose on the shaft 25 and is normally in driving engagement therewith through a clutch 91. This clutch is normally held out of engagement by an arm 92 having an end wedge outline, as indicated at 93 in Fig. 11, which is engaged behind a connecting wedge pin 94 which connects the clutch parts when in retracted position. The arm 92 is pulled up by a spring 95 engaging a bent over pin 96 extending out from the bed. If the arm be lowered in any fashion momentarily the clutch pin will move in and connect the clutch. The pulley will then revolve the shaft through a complete revolution or until the pin is in position to be disengaged by the arm. The apparatus is so designed and constructed that a complete bending or knotting operation occurs during this single revolution. While the arm may be withdrawn in any suitable fashion from certain aspects of the invention I prefer to provide means for automatically withdrawing it immediately upon the location of the wire in accurate position. A solenoid magnet 97 is mounted beneath the arm and the armature 98 of this magnet is connected by a link 99 with the arm 92. The circuit for energizing the magnet includes a suitable source of electric energy 101 and contacts that are moved into position for engagement by the wire courses when the wire courses arrive at the desired positions. A lever 102 is pivoted at 103 upon the platen and has a curved arm 104 which is bevelled at its end at 105 for engagement by the wire. The wire normally pushes this lever back against the force of a spring 106 connecting the other end 107 of the lever with a bent over pin 108 on the bed. This lever is so positioned that the lower course engages it and pushes it back as described. A second lever 109 is pivoted at 110 in the platen and extends across it. This lever has its forward end 111 bent up into position to be depressed by the upper course of wire when the latter arrives in position for clamping and this depression moves the lever 109 up into position to engage an insulated contact 113 on the arm or tail 107 of the lever 102, when the latter is moved by the lower course of wire, thus completing the electric circuit.

The circuit includes then the solenoid 97, a source of electrical energy 101 and the two contacts 113 and 107. Suitable connecting wires are provided to arrange these parts in series and if desired one side of the circuit may be grounded through the machine and through the contact 109. It should be noted that even after the circuit is broken the arm 92 cannot move the clutch out of engagement until the wedge pin 94 is brought to proper position and forced out by said arm, and this does not occur until after completion of the second bending action which follows almost immediately upon the first.

It will be noted that the arm 104 of the lever 102 is so positioned that when the wire is given its initial bend, as shown in Figure 7, the lever may be pulled away by the spring 106 to interrupt the circuit. When the circuit is established the arm 92 of the clutch control is withdrawn and the machine starts upon its cycle of operation. The contact is broken by the bending of the wire away from the retracted position of the lever 102 and the arm of the clutch control is moved up into position to disconnect the pulley from the shaft after a complete revolution to halt the machine.

Locking means are provided for preventing movement of the gears 87 and 88 when out of mesh with the gear segment 83. This locking means comprises a latch 115 pivoted at 82 on the arm and pressed toward the gear 88 by a spring 117 engaging the latch and a pin 118 on the arm. This latch carries a tooth 119 adapted to enter into the gear teeth of the gear 88. It is pulled away from these teeth by a stop 121 on the lever 63 just before the gears reach entraining position and re-engages between the teeth of the gear 88 as soon as the return movement of the swinging arm has detrained said gear from the rack segment.

It is thought that the invention and many of its attendant advantages will be understood from the foregoing without further description and it will be apparent that various changes may be made in the form, construction and arrangement of the parts without departing from the spirit and scope of the invention or sacrificing all of its material advantages, the form hereinbefore disclosed being merely a preferred embodiment thereof.

I claim:

1. In a wire bending machine, the combination of a support, devices for holding the wire in position to bend on the support, a swinging bending member, power means for actuating the same and normally disconnected therefrom, and means swinging with the bending member and engageable with the power means for imparting a bending action to said bending member by automatically connecting it with said power means when the bending member has arrived at operative position.

2. In a wire bending machine a rotating bending member, oscillating means for driving the same and means automatically connecting said bending member with said driving means when the bending member is in bending position and while said driving means is at rest just prior to the reversal of its movement in oscillation.

3. In a wire bending machine, the combination of a bending device, a gear for driving the same, means for actuating said gear, a mounting for the gear and means for moving said mounting bodily to move said gear into and out of engagement with said actuating means.

4. In a wire bending machine the combination of a swinging member, bending devices carried thereby, means for driving said bending devices and means for swinging said member toward and from said driving means to establish driving connections for said bending devices.

5. In a wire bending machine the combination of a power shaft, an oscillating rack driven thereby, a swinging frame, a bending device carried thereby, gears on the swinging frame for actuating said bending device, and means operable from the power shaft for entraining said gears with said rack by movement of the swinging frame.

6. In a wire bending machine the combination of a power shaft, an oscillating rack driven thereby, a swinging frame, a bending device carried thereby, gears on the swinging frame for actuating said bending device, and means operable from the power shaft for entraining said gears with said rack by movement of the swinging frame, and for detraining therefrom after the bending device has had predetermined movement.

7. In a wire bending machine the combination of a power shaft, an oscillating rack driven thereby, a swinging frame, a bending device carried thereby, gears on the swinging frame for actuating said bending device, and means operable from the power shaft for entraining said gears with said rack by movement of the swinging frame, and while said rack is at rest just prior to change of direction of operation.

8. In a wire bending machine the combination of a power shaft, an oscillating rack driven thereby, a swinging frame, a bending device carried thereby, gears on the swinging frame for actuating said bending device, and means operable from the power shaft for entraining and detraining said gears with said rack and means for holding said gears immovable while detrained.

9. In a wire bending machine the combination of a power shaft, a swinging frame, bending devices carried thereby, driving mechanism for the bending devices and actuated by the power shaft, the swinging of the frame serving to detrain said driving devices.

10. In a wire bending machine the combination of a power shaft, a swinging frame, bending devices carried thereby, driving mechanism for the bending devices and actuated by the power shaft, the swinging of the frame serving to detrain said driving mechanism and to hold the detrained members of said mechanism immovable while detrained condition is maintained.

11. In a wire bending machine, the combination of supports on which two courses of wire may be placed, movable bending mechanism, means on the support for clamping both courses of wire in the desired position and with equalized pressure, and means carried by the bending mechanism for actuating said clamping means.

12. In a wire bending machine, the combination of supports on which two courses of wire may be placed, movable bending mechanism, means on the support for clamping both courses of wire in the desired position, and means carried by the bending mechanism for actuating said clamping means.

13. In a wire knotting machine the combination of a support for holding the two courses of wire to be knotted, a knotting mechanism, and means for clamping the wire positively in position on said support during the action of said knotting mechanism, said clamping means being actuated by the knotting mechanism.

14. In a wire bending machine the combination of a power shaft, a support, a bending device, means normally out of driving engagement with said shaft for actuating said bending device, and electrical means automatically engaging said devices with said power shaft when the wire to be bent is in accurate position.

15. In a wire knotting machine the combination of a support for the two courses of wire to be knotted, knotting device, driving means therefor, and electrical means for establishing driving connection automatically when the two courses of wire are both in accurate position upon said support.

16. In a wire bending machine the combination of a support, a bending device having movement into bending position, and a bending movement thereafter, power mechanism, and electrical means for connecting said power mechanism with said bending device to produce said movement, said electrical means being automatically rendered operative by the wire in proper position on said support.

ANTHONY RHENSTROM.